US012404705B2

(12) United States Patent
Ishii et al.

(10) Patent No.: US 12,404,705 B2
(45) Date of Patent: Sep. 2, 2025

(54) VEHICLE DOOR CONTROL DEVICE AND VEHICLE DOOR HANDLE DEVICE

(71) Applicant: Alpha Corporation, Kanagawa (JP)

(72) Inventors: Shun Ishii, Kanagawa (JP); Hiroaki Sakakura, Kanagawa (JP)

(73) Assignee: ALPHA CORPORATION, Yokohama (JP)

( * ) Notice: Subject to any disclaimer, the term of this patent is extended or adjusted under 35 U.S.C. 154(b) by 201 days.

(21) Appl. No.: 17/907,086

(22) PCT Filed: Jan. 27, 2021

(86) PCT No.: PCT/JP2021/002918
§ 371 (c)(1),
(2) Date: Sep. 22, 2022

(87) PCT Pub. No.: WO2021/215062
PCT Pub. Date: Oct. 28, 2021

(65) Prior Publication Data

US 2023/0212891 A1 Jul. 6, 2023

(30) Foreign Application Priority Data

Apr. 24, 2020 (JP) ................................ 2020-077691

(51) Int. Cl.
*E05B 81/76* (2014.01)
*E05B 81/56* (2014.01)
*E05B 85/10* (2014.01)

(52) U.S. Cl.
CPC .............. *E05B 81/77* (2013.01); *E05B 81/56* (2013.01); *E05B 85/10* (2013.01)

(58) Field of Classification Search
CPC ........... E05B 81/56; E05B 81/77; E05B 85/10
See application file for complete search history.

(56) References Cited

U.S. PATENT DOCUMENTS 6,998,968 B2 * 2/2006 Garnault ................. E05B 81/78 340/542
7,091,836 B2 * 8/2006 Kachouh ................ E05B 81/78 307/10.1

(Continued)

FOREIGN PATENT DOCUMENTS

DE 102005061755 6/2007
DE 102007051495 A1 * 5/2009 ............ E05B 81/78

(Continued)

OTHER PUBLICATIONS

International Preliminary Report on Patentability, counterpart International App. No. PCT/JP2021/002918 (Nov. 3, 2022) (7 pages) (translated).

(Continued)

*Primary Examiner* — Carlos Lugo
(74) *Attorney, Agent, or Firm* — Cook Alex Ltd.

(57) ABSTRACT

A vehicle door control device 1 according to the present invention relates to a vehicle door control device 1 for controlling opening and closing of a door of a vehicle, wherein the vehicle door control device 1 comprises: a handle member 30 attached to the door; an entry detection sensor 31 for detecting entry of an object into a space between the door and the handle member 30; an external force detection sensor 32 for detecting application of an external force to the handle member 30; and a circuit portion 4 connected to the entry detection sensor 31 and the external force detection sensor 32, the circuit portion 4 releasing a latch of the door when the external force detection sensor 32 detects the application of the external force and the entry detection sensor 31 detects the entry of the object.

12 Claims, 4 Drawing Sheets

(56) References Cited

U.S. PATENT DOCUMENTS

| | | | | |
|---|---|---|---|---|
| 7,375,299 | B1 * | 5/2008 | Pudney | E05B 81/78 200/61.62 |
| 8,636,309 | B2 * | 1/2014 | Muller | E05B 81/78 292/336.3 |
| 9,903,142 | B2 | 2/2018 | Van Wiemeersch et al. | |
| 10,301,855 | B2 | 5/2019 | Van Wiemeersch et al. | |
| 10,385,595 | B2 | 8/2019 | Witte et al. | |
| 11,078,692 | B2 * | 8/2021 | Spick | H03K 17/954 |
| 2002/0125994 | A1 * | 9/2002 | Sandau | G07C 9/00309 340/5.72 |
| 2003/0029210 | A1 * | 2/2003 | Budzynski | E05B 85/10 70/264 |
| 2004/0177478 | A1 | 9/2004 | Louvel | |
| 2018/0128022 | A1 | 5/2018 | Van Wiemeersch et al. | |
| 2019/0048645 | A1 | 2/2019 | Nakatomi et al. | |
| 2020/0130646 | A1 | 4/2020 | Peterson | |

FOREIGN PATENT DOCUMENTS

| | | | | |
|---|---|---|---|---|
| DE | 102016124037 | A1 * | 6/2018 | B60R 25/245 |
| EP | 2592201 | A2 * | 5/2013 | B29C 45/14639 |
| EP | 3179020 | A1 * | 6/2017 | E05B 15/0053 |
| JP | H11-315657 | | 11/1999 | |
| JP | 2008-240415 | | 10/2008 | |
| JP | 2014-181499 | | 9/2014 | |
| JP | 2016-138845 | | 8/2016 | |
| JP | 2019-031858 | | 2/2019 | |

OTHER PUBLICATIONS

International Search Report (with English translation) and Written Opinion, counterpart International App. No. PCT/JP2021/002918 (Apr. 6, 2021) (11 pages).

Extended European Search Report, counterpart EP 21792588.2 (Apr. 19, 2024) (8 pages).

* cited by examiner

VEHICLE DOOR CONTROL DEVICE AND VEHICLE DOOR HANDLE DEVICE

The present application is a U.S. National Stage of PCT International Patent Application No. PCT/JP2021/002918, filed Jan. 27, 2021, which claims priority to JP Application No. 2020-077691, filed Apr. 24, 2020, both of which are hereby incorporated herein by reference.

FIELD OF THE INVENTION

The present invention relates to a vehicle door control device and a vehicle door handle device for controlling opening and closing of a door of a vehicle.

BACKGROUND OF THE INVENTION

In general, opening of a vehicle door requires two operations: unlocking and latch releasing. The unlocking is performed by operating a lock actuator, which is triggered by a signal from a mechanical switch (request switch) or a touch sensor provided at a door handle. The latch releasing is performed by driving a latch connected to the door handle via a wire, which is triggered by pulling the door handle.

Recently, an electric latch system is being increasingly adopted for the purpose of improving degree of freedom in collision safety design and/or reducing a handle operational ability for latch releasing. In the electric latch system, the latch is released by driving the latch with an actuator, which is triggered by a signal from a sensor provided at the door handle, without using a wire connection between the door handle and the latch.

For example, Patent Literature 1 as described below discloses that a vibration sensor for detecting vibration caused by a user's operation for unlocking a door is used as the sensor provided at the door handle.

CITATION LIST

Patent Literature

[Patent Literature 1] Japanese Patent Application Publication No. 2008-240415 A

SUMMARY OF THE INVENTION

Technical Problem

When the electric latch system is employed, the latch releasing performed at the same time the unlocking, which is triggered by the signal from the sensor provided at the door handle, may cause a risk that the latch is unintentionally released. Therefore, it is desirable to provide separate triggers for unlocking and latch releasing. Further, to reduce discomfort from the conventional opening and closing operation of the door, the trigger for the latch releasing is preferably the operation of the door handle.

As described above in Patent Literature 1, when the vibration sensor is provided at the door handle and the latch is released only by the detection of vibration by the vibration sensor as the trigger, there is a risk that the latch is released, for example, even if a user does not intend to open the door, such as when the user leans against the door handle or an impact is applied to the door handle.

The present invention is made to solve the problems as described above. An object of the present invention is to provide a vehicle door control device and a vehicle door handle device, which can reduce the risk that the latch is unintentionally released.

Solution to Problem

A vehicle door control device according to the present invention relates to a vehicle door control device for controlling opening and closing of a door of a vehicle, wherein the vehicle door control device comprises: a handle member attached to the door; an entry detection sensor for detecting entry of an object into a space between the door and the handle member; an external force detection sensor for detecting application of an external force to the handle member; and a circuit portion connected to the entry detection sensor and the external force detection sensor, the circuit portion releasing a latch of the door when the external force detection sensor detects the application of the external force and the entry detection sensor detects the entry of the object.

A vehicle door handle device according to the present invention is a vehicle door handle device used for opening and closing a door of a vehicle, wherein the vehicle door handle device comprises: a handle member attached to the door; an entry detection sensor for detecting entry of an object into a space between the door and the handle member; and an external force detection sensor for detecting application of an external force to the handle member.

Advantageous Effects of Invention

According to the vehicle door control device of the present invention, the circuit portion releases the latch of the door when the external force detection sensor detects the application of the external force and the entry detection sensor detects the entry of the object, so that the risk that the latch is unintentionally released can be reduced. Further, according to the vehicle door handle device of the present invention, it includes the entry detection sensor and the external force detection sensor, so that the control of the door latch releasing as described above can be achieved using those sensors, and a risk that the latch is unintentionally released can be reduced.

DETAILED DESCRIPTION OF THE INVENTION

Hereinafter, embodiments for implementing the present invention will be described with reference to the drawings. The present invention is not limited to each embodiment, and components can be modified and embodied without departing from the spirit of the present invention. Further, various inventions can be formed by appropriately combining a plurality of components disclosed in each embodiment. For example, some components may be removed from all of the components shown in the embodiments. Furthermore, the components of different embodiments may be optionally combined.

Figure 1:
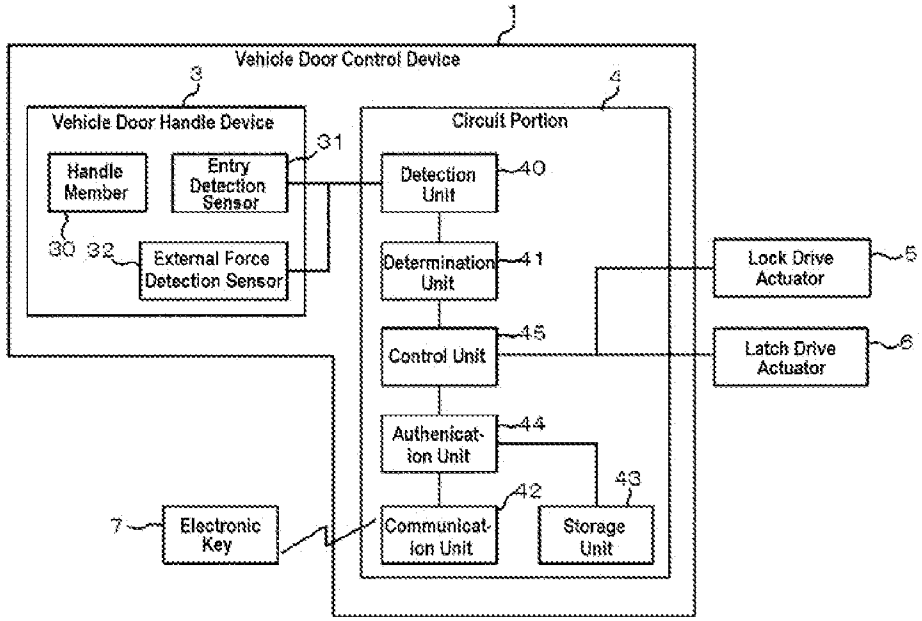
FIG. 1 is a block diagram showing a vehicle door control device according to an embodiment of the present invention.
Figure 2:
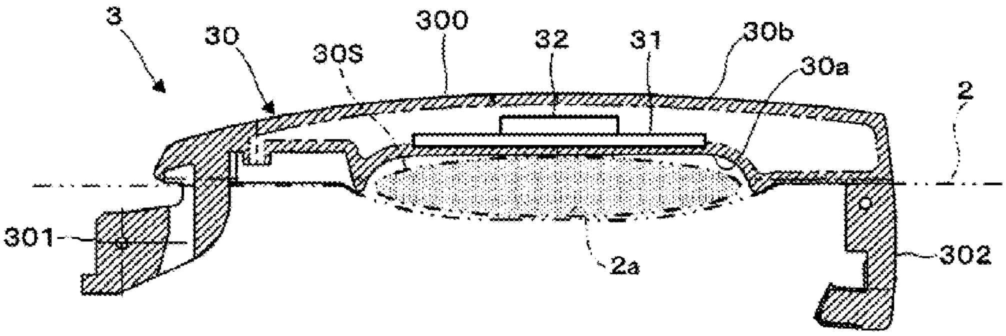
FIG. 2 is a cross-sectional view of an example of a vehicle door handle device in FIG. 1.

FIG. 1 is a block diagram showing a vehicle door control device 1 according to an embodiment of the present invention, and FIG. 2 is a cross-sectional view of an example of a vehicle door handle device 3 in FIG. 1. The vehicle door control device 1 shown in FIG. 1 is a device for controlling the opening and closing of a vehicle door 2 (see FIG. 2). The vehicle door control device 1 according to this embodiment has the vehicle door handle device 3 and a circuit portion 4.

The vehicle door handle device 3 is a device attached to the door 2 of the vehicle. More particularly, the vehicle door handle device 3 can be attached to an outer side of the door 2. The vehicle door handle device 3 includes a handle member 30, an entry detection sensor 31 and an external force detection sensor 32.

The handle member 30 is a member attached to the door 2 of the vehicle. The handle member 30 may be attached to the door 2 of the vehicle in any manner, but the handle member 30 according to the present embodiment is attached to the door 2 so as to protrude outward from an outer surface of the door 2 as shown in FIG. 2. The handle member 30 according to this embodiment includes: a longitudinal gripping portion 300; and first and second leg portions 301, 302 extending from both end portions of the gripping portion 300 in the longitudinal direction to a direction crossing the longitudinal direction of the gripping portion 300. The gripping portion 300 may be arranged such that the longitudinal direction of the gripping portion 300 extends in the front-rear direction of the vehicle. The handle member 30 can be attached to the door 2 such that the first and second leg portions 301, 302 are inserted into the interior of the door 2 while allowing the gripping portion 300 to protrude from the outer surface of the door 2.

Although the handle member 30 may always protrude from the outer surface of the door 2, the handle member 30 may be configured to be displaceable in the thickness direction of the door 2 (the width direction of the vehicle), and may be housed inside the door 2 when it is assumed that the door 2 will not be opened or closed by a user, such as after the user gets into the vehicle or the user leaves the vehicle.

The handle member 30 forms a space 30S between the handle member 30 and the door 2. The space 30S can be formed between the griping portion 300 and the door 2. The space 30S can be formed by separating an inner surface 30*a* of the handle member 30 (a surface facing the outer surface of the door 2) and an outer surface 2*a* of the door 2 from each other. By providing a recessed portion on at least one of the inner surface 30*a* of the handle member 30 and the outer surface 2*a* of the door 2, the inner surface 30*a* of the handle member 30 and the outer surface 2*a* of the door 2 can be separated from each other. FIG. 2 shows an embodiment where both the inner surface 30*a* of the handle member 30 and the outer surface 2*a* of the door 2 are provided with the recessed portions. The inner surface 30*a* of the handle member 30 and the outer surface 2*a* of the door 2 may be separated by the length of the first and second leg portions 301, 302. That is, the inner surface 30*a* of the handle member 30 and the outer surface 2*a* of the door 2 may extend parallel to each other.

It is assumed that, in the vehicle door handle device 3 according this embodiment, the user performs a pulling operation of the handle member 30 when the user opens the vehicle door 2. The pulling operation can be performed by inserting a user's finger(s) into the space 30S and then pulling the handle member 30 forward (outside the vehicle), by the user who is outside the vehicle.

The entry detection sensor 31 is a sensor for detecting the entry of the object into the space 30S between the door 2 and the handle member 30. The entry detection sensor 31 can detect the entry of the user's finger(s) into the space 30S.

The entry detection sensor 31 can be configured by any sensor. The entry detection sensor 31 may be a non-contact sensor or a contact sensor. Examples of the non-contact sensor include electrostatic capacitive, optical, and ultrasonic proximity sensors or cameras. For example, when the entry detection sensor 31 is the electrostatic capacitive proximity sensor, the entry of the object can be detected depending on a change in electrostatic capacity of the space 30S. The camera can image the handle member 30 or the finger(s) of the user. By analyzing the image data taken by the camera, the entry of the object into the space 30S can be detected. Examples of the camera include a dashboard camera, a side mirror camera, and a camera for monitoring the surroundings of the vehicle. Examples of the contact sensor can include an electrostatic capacitive touch sensor or an ultrasonic touch sensor. For example, when the entry detection sensor 31 is the electrostatic capacitive contact sensor, the contact of a foreign object may be detected as the entry of the object into the space 30S when detecting the contact of the foreign object with the inner surface 30*a* of the handle member 30.

The entry detection sensor 31 can be attached at any position. The entry detection sensor 31 according to this embodiment is attached to the handle member 30. More particularly, the entry detection sensor 31 is arranged inside the hollow gripping portion 300. The entry detection sensor 31 may make up the inner surface 30*a* of the gripping portion 300 so as to be adjacent to the space 30S. However, the entry detection sensor 31 may be provided at other positions, such as the first and second leg portions 301, 302 or the door 2, for example. Further, when the camera is used as the entry detection sensor 31 as described above, the entry detection sensor 31 may be provided in the vehicle interior or near the side mirror. The position where the entry detection sensor 31 is provided can be changed depending on the type of the sensor that forms the entry detection sensor 31.

The external force detection sensor 32 is a sensor for detecting the application of an external force to the handle member 30. The external force detection sensor 32 can detect the application of the external force to the handle member 30 by a pulling operation when the user performs the pulling operation.

The external force detection sensor 32 can be configured by any sensor. The external force detection sensor 32 can detect the application of the external force to the handle member 30 based on information such as vibration, pressure, deformation or acceleration applied to the handle member 30. Examples of the external force detection sensor 32 include pressure sensors, strain sensors, inductive sensors, and the like. When the external force detection sensor 32 is the pressure sensor or the strain sensor, it is possible to detect bending of the handle member 30 due to the external force applied to the handle member 30. When the external force detection sensor 32 is the inductive sensor, one of the inner surface 30*a* of the handle member 30 and a design surface 30*b* (a surface of the handle member 30 on the outer side of the vehicle) is provided with a sensing portion of the inductive sensor, and the other is provided with a portion to be sensed, whereby displacement of a distance between the inner surface 30*a* and the design surface 30*b* caused by the bending of the handle member 30 when the pulling operation is performed may be detected, and the generation of the external force may be detected. The sensing portion of the inductive sensor may be a coil, and the portion to be sensed of the inductive sensor may be a conductor. The handle member 30 includes: a first member having the inner surface 30*a*; and a second member having the design surface 30*b* and displaceable in directions approaching to and leaving from the first member, and the first member approaches to the second member by the pulling operation, so that the inductive sensor may detect the displacement of the distance between the inner surface 30*a* and the design surface 30*b*.

The external force detection sensor 32 can be attached to any position. The external force detection sensor 32 according to this embodiment is attached to the handle member 30. More particularly, the entry detection sensor 31 is arranged inside the hollow gripping portion 300. However, the external force detection sensor 32 may be provided at other positions such as the first and second leg portions 301, 302, for example. The position where the external force detection sensor 32 is provided can be changed depending on the type of sensor that forms the external force detection sensor 32.

As shown in FIG. 2, the external force detection sensor 32 is preferably arranged at a position closer to the design surface 30*b* of the handle member 30 than the entry detection sensor 31. As will be described later, in the vehicle door handle device 3 according to this embodiment, the door 2 is also locked when the external force detection sensor 32 detects the external force applied to the handle member 30 from the design surface 30*b* side. By arranging the external force detection sensor 32 at the position closer to the design surface 30*b* than the entry detection sensor 31, the detection accuracy of the external force from the design surface 30*b* side can be more reliably improved. Also, the entry detection sensor 31 is preferably arranged at a position closer to the inner surface 30*a* of the handle member 30 than the external force detection sensor 32. The accuracy of detecting the object entering the space 30S can be improved.

The circuit portion 4 is composed of, for example, a storage unit storing a program and a device such as a computer or a dedicated circuit that performs arithmetic processing based on the program. Any number of hardware may form the circuit portion 4. For example, the circuit portion 4 may be formed by one computer, or may be formed by two or more computers. The circuit portion 4 may be provided at any position, and it may be built in the handle member 30 or the door 2, or may be mounted on a vehicle body. The vehicle body is a component of the vehicle excluding the door 2. For example, the circuit portion 4 may be formed by the computer built in the door 2 or the handle member 30 and the computer mounted on the vehicle body.

The circuit portion 4 is connected to the entry detection sensor 31 and the external force detection sensor 32, and locking/unlocking and/or releasing of the latch of the door 2 are performed based on signals from the entry detection sensor 31 and the external force detection sensor 32.

More particularly, the circuit portion 4 can unlock the door 2 when the entry detection sensor 31 detects the entry of the object while the door 2 is locked. That is, in the vehicle door control device 1 according this embodiment, the door 2 can be unlocked when the user's finger(s) enter(s) the space 30S.

Further, the circuit portion 4 can lock the door 2, when the entry detection sensor 31 does not detect the entry of the object and the external force detection sensor 32 detects the application of the external force while the door 2 is unlocked. That is, in the vehicle door control device 1 according to this embodiment, the door 2 can be locked when an external force is applied to the handle member without inserting the user's finger(s) into the space 30S, such as when the handle member 30 is knocked or pressed from the side of the design surface 30*b*.

Also, the circuit portion 4 can release the latch of the door 2, when the entry detection sensor 31 detects the entry of the object and the external force detection sensor 32 detects the application of the external force while the door 2 is unlocked. That is, in the vehicle door control device 1 according to this embodiment, the latch of the door 2 can be released when the user puts his/her finger(s) into the space 30S and applies an external force to the handle member 30 by, for example, the pulling operation. In other words, the latch of the door 2 is not released and the state where the door 2 is locked to the vehicle body is maintained, only by the user putting his/her finger(s) into the space 30S or applying the external force to the handle member 30.

The locking/unlocking and releasing of the latch of the door 2 by the circuit portion 4 can be performed via a lock drive actuator 5 and a latch drive actuator 6.

The circuit portion 4 inputs a lock command or an unlock command to the lock drive actuator 5 when locking or unlocking the door 2. The lock drive actuator 5 can drive the lock member according to the lock command or unlock command from the circuit portion 4 to lock and unlock the door. The driving of the lock member restricts or permits the driving of the latch by the latch driving actuator 6.

The door 2 is locked when the driving of the latch is restricted, and the door 2 is unlocked when the driving of the latch is permitted.

The circuit portion 4 inputs a release command to the lock drive actuator 5 when releasing the latch of the door 2. The latch drive actuator 6 can drive the latch in response to the release command from the circuit portion 4 to release the latch.

As shown in FIG. 1, the circuit portion 4 according to this embodiment has a detection unit 40, a determination unit 41, a communication unit 42, a storage unit 43, an authentication unit 44 and a control unit 45.

The detection unit 40 is connected to the entry detection sensor 31 and the external force detection sensor 32. Signals from the entry detection sensor 31 and the external force detection sensor 32 are input to the detection unit 40. The detection unit 40 detects the states of the entry detection sensor 31 and the external force detection sensor 32 and inputs the detection results to the determination unit 41. The detector 40 may be provided in the handle member 30 (gripping portion 300), although not limited thereto.

The determination unit 41 determines whether or not the detection result of the detection unit 40 satisfies a preset condition, and inputs the determination result to the control unit 45. The determination unit 41 may be provided in a controller on the vehicle side, although not limited thereto.

The communication unit 42 communicates with an electronic key 7 and transmits/receives signals or information to/from the electronic key 7. The electronic key 7 is a device or terminal carried by a vehicle user and stores a predetermined authentication ID. An example of communication between the communication unit 42 and the electronic key 7 is as follows. That is, the communication unit 42 transmits a request signal toward the vicinity of the vehicle. When the electronic key 7 receives the request signal from the communication section 42, the electronic key 7 transmits the authentication ID stored in the electronic key 7 to the communication unit 42. The communication unit 42 inputs the received authentication ID to the authentication unit 44.

The communication unit 42 may be provided in the handle member 30 (gripping portion 300), although not limited thereto.

The storage unit 43 stores a specific authentication ID in advance. The storage unit 43 may be provided at the controller on the vehicle side, but it may also be provided in the handle member 30 (gripping portion 300), although not limited thereto.

When the authentication ID is input from the communication unit 42, the authentication unit 44 compares the authentication ID from the communication unit 42 with the authentication ID stored in the storage unit 43, and inputs the result of the comparison to the control unit 45. The authentication unit 44 may be provided at the controller on the vehicle side, but it may also be provided in the handle member 30 (gripping portion 300), although not limited thereto.

Based on the determination result of the determination unit 41 and the authentication result of the authentication unit 44, the control unit 45 inputs command signals to the lock drive actuator 5 and the latch drive actuator 6 to control the operations of the lock drive actuator 5 and the latch drive actuator 6. Also, the control unit 45 confirms the states of the lock drive actuator 5 and the latch drive actuator 6. The control unit 45 may be provided at the controller on the vehicle side, although not limited thereto.

As described above, in the vehicle door control device 1 according to this embodiment, the latch of the door 2 is released based on the signals from the entry detection sensor 31 and the external force detection sensor 32. That is, the latch can be released without a wire connection between the handle member 30 and the latch. As such, the handle member 30 may not be connected to the latch via a wire. Further, the handle member 30 may not be displaced in order to pull the wire, and the handle member 30 may be fixed to the door 2.

However, in the vehicle door control device 1 according to this embodiment, the handle member 30 may also be connected to the latch by a wire, and the handle member 30 may be displaceably attached to the door 2 in order to pull the wire. Such wire connection is useful in the event of abnormality such as a dead battery.

When adopting such an embodiment, the handle member 30 may be provided with a displacement suppression mechanism that suppresses the displacement of the handle member 30 until a pulling operation involving the application of the external force exceeding a predetermined magnitude is performed. The displacement suppression mechanism may include, for example, an urging member that urges the handle member 30 in a direction opposite to the pulling operation with an urging force greater than or equal to a predetermined value, or a friction brake provided on a rotation shaft of the handle member 30. The urging member may directly urge the handle member 30, or indirectly urge the handle member 30 via a member coupled to the handle member 30. When the handle member 30 is connected to a counterweight for applying an inertial force to the handle member 30, the urging member may be a spring of a lever coupled to or integral with the counterweight. By providing the displacement suppression mechanism at the handle member 30, the opening of the door 2 at normal time can be performed without displacing the handle member 30, thereby improving usability.

Figure 3:
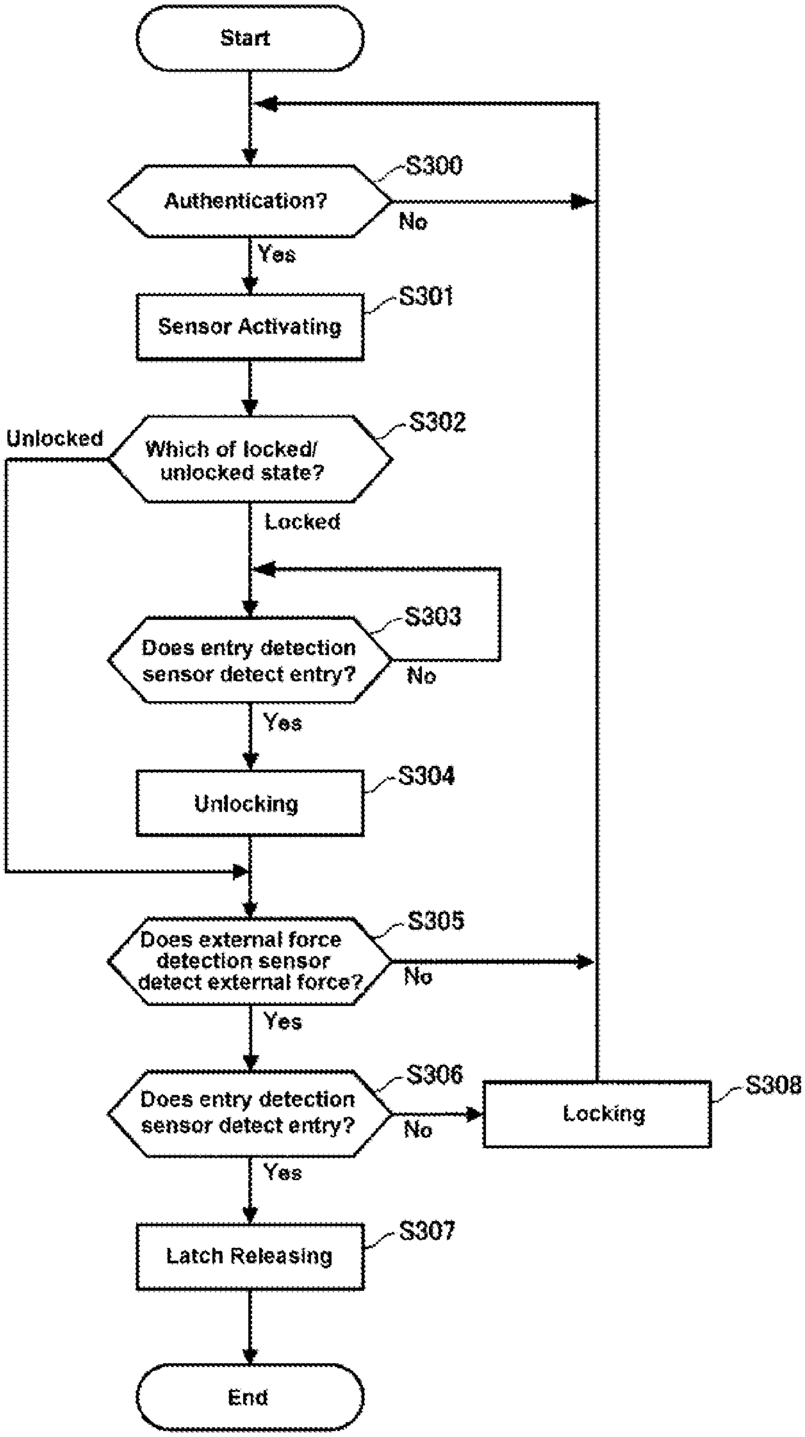
FIG. 3 is a flow chart showing an example of a control operation by a circuit portion in FIG. 1.

Next, FIG. 3 is a flow chart showing an example of a control operation by the circuit portion 4 in FIG. 1. As shown in FIG. 3, when the control operation of the circuit portion 4 is started, it is determined whether or not the electronic key 7 is authenticated (step S300). As described above, when the communication unit 42 receives the authentication ID from the electronic key 7 and the authentication ID matches the authentication ID stored in the storage unit 43, it is determined that the electronic key 7 has been authenticated. When the electronic key 7 is authenticated, the entry detection sensor 31 and the external force detection sensor 32 are activated (step S301). In other words, in the illustrated embodiment, the entry detection sensor 31 and the external force detection sensor 32 are inactive until the electronic key 7 is authenticated, and the power consumption of these sensors 31, 32 is reduced or zero.

When the entry detection sensor 31 and the external force detection sensor 32 are activated, the locked/unlocked state of the door 2 is determined (step S302). The locked/unlocked state can be implemented by the control unit 45 confirming the state of the lock drive actuator 5.

When it is determined that the door 2 is locked during this determination, it is determined whether or not the entry of an object into the space 30S has been detected by the entry detection sensor 31 (step S303). This determination is performed until it is determined that the entry detection sensor 31 detects the entry of the object. When it is determined that the entry detection sensor 31 detects the entry of the object, it is determined that the user has put his/her hand on the handle with the intention of unlocking or opening the door, so that the door 2 is unlocked (step S304). The door 2 can be unlocked by inputting an unlock command from the control unit 45 to the lock drive actuator 5.

After the door 2 is unlocked, the detection states of the external force detection sensor 32 and the entry detection sensor 31 are determined (steps S305, S306). During this determination, when it is determined that the external force detection sensor 32 detects the application of the external force and the entry detection sensor 31 detects the entry of the object, it is determined that the user applies a load to the handle member with the user holding the door, that is, the user performs the pulling operation of the handle member 30 in order to open the door, so that the latch of the door 2 is released (step S307), and the control operation of the circuit portion 4 is terminated. The latch can be released by inputting a release command from the control portion 45 to the lock drive actuator 5. It should be noted that the object entry detection in the step S306 includes the case where the entry detection in the step S303 is continued. Therefore, the circuit portion 4 according to this embodiment can detect a series of unlocking and door opening operations by the user.

On the other hand, when it is determined that the application of the external force is not detected by the external force detection sensor 32 after the door 2 is unlocked (the external force detection sensor 32 does not detect the application of the external force), the control operation of the circuit portion 4 is returned to the step S300.

Further, after the door 2 is unlocked, when it is determined that the application of the external force is detected by the external force detection sensor 32, while the entry of the object is not detected by the entry detection sensor 31, it is determined that the user applies a load to the handle member 30 without holding his/her hand on the handle member 30, i.e., performs a pushing operation into the handle member 30 for locking, so that the door 2 is locked (step S308). The door 2 can be locked by inputting a lock command from the control portion 45 to the lock drive actuator 5.

Figure 4:
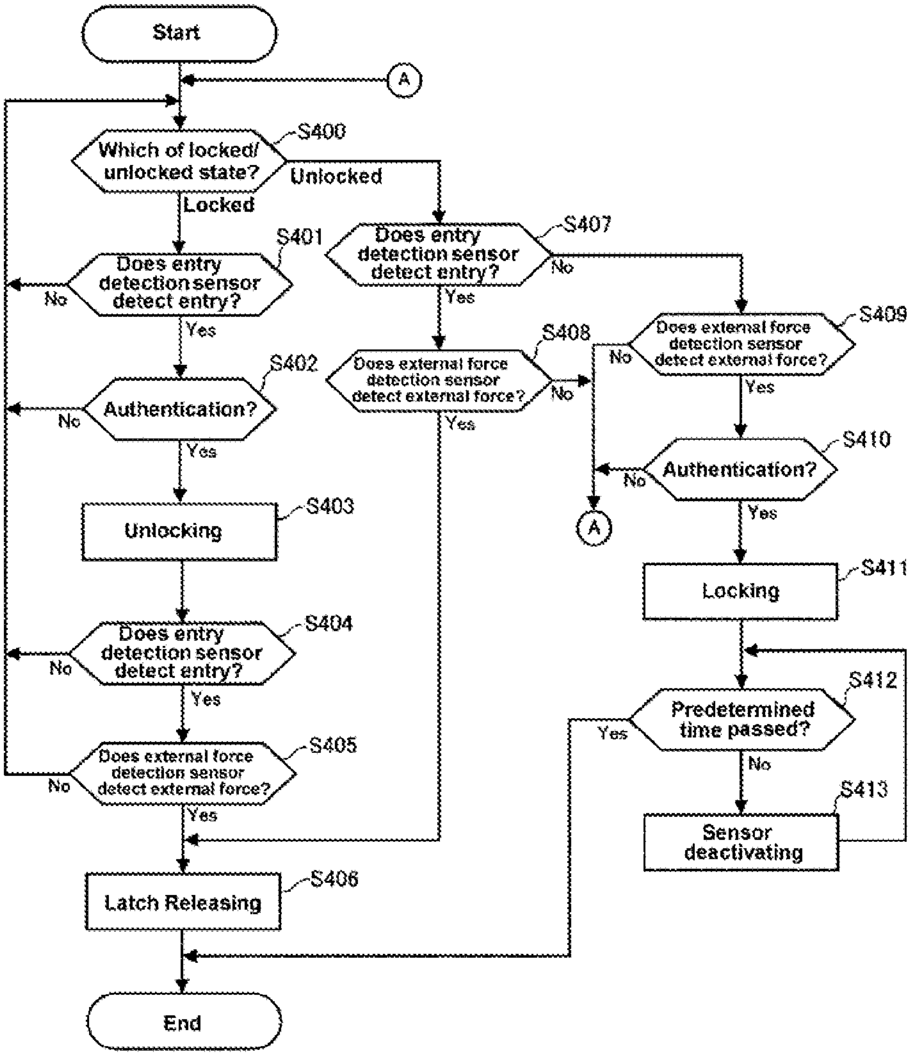
FIG. 4 is a flow chart showing another example of a control operation by a circuit portion in FIG. 1.

Next, FIG. 4 is a flow chart showing another example of a control operation by the circuit portion 4 in FIG. 1. In the control operation shown in FIG. 3, the electronic key 7 is authenticated before it is determined whether the locking/ unlocking conditions are satisfied, but the authentication of the electronic key 7 may be performed after determining whether or not the locking/unlocking conditions are satisfied, as shown in FIG. 4.

In the example as shown in FIG. 4, when the control operation of the circuit portion 4 is started, the locked/unlocked state of the door 2 is determined (step S400). The locked/unlocked state can be implemented by the control portion 45 confirming the state of the lock drive actuator 5.

When it is determined that the door 2 is locked during the determination, it is determined whether or not the entry of the object into the space 30S has been detected by the entry detection sensor 31 (step S401). During this determination, if it is determined that the entry detection sensor 31 has not detected the entry of the object, the control operation of the circuit portion 4 is returned to step S400. On the other hand, if it is determined that the entry detection sensor 31 has detected the entry of the object, it is determined whether or not the electronic key 7 is authenticated (step S402), and when it is determined that the electronic key 7 has been authenticated, the door 2 is unlocked (step S403). The door 2 can be unlocked by inputting an unlock command from the control portion 45 to the lock drive actuator 5. If the electronic key 7 is not authenticated, the door 2 is not unlocked and the control operation of the circuit portion 4 is returned to the step S400.

After the door 2 is unlocked, the detection states of the entry detection sensor 31 and the external force detection sensor 32 are determined (steps S404, S405). During this determination, when it is determined that the entry detection sensor 31 has detected the entry of the object and the external force detection sensor 32 has detected the application of the external force, the latch of the door 2 is released (step S406), and the control operation of the circuit portion 4 is terminated. The latch can be released by inputting a release command from the control portion 45 to the lock drive actuator 5. On the other hand, when it is determined that the entry detection sensor 31 has not detected the entry of the object or the external force detection sensor 32 has not detected the application of the external force, the control operation is returned to the step S400 without releasing the latch of the door 2.

When it is determined that the door 2 is unlocked during the determination in the step S400, it is determined whether or not the entry of the object into the space 30S is detected by the entry detection sensor 31 (step S407). During this determination, if it is determined that the entry detection sensor 31 has detected the entry of the object, it is determined whether or not the external force detection sensor 32 detects the application of the external force (step S408). During this determination, if it is determined that the external force detection sensor 32 has detected the application of the external force, the latch of the door 2 is released (step S406), and the control operation of the circuit portion 4 is terminated. On the other hand, during the determination in the step S4008, if the external force detection sensor 32 has not detected the application of the external force, the control operation is returned to the step S400 without releasing the latch of the door 2.

During the determined in the step S407, if the entry detection sensor 31 has not detected the entry of the object, it is determined whether or not the external force detection sensor 32 detects the application of the external force (step S409). During this determination, if it is determined that the external force detection sensor 32 has detected the application of the external force, it is determined whether or not the electronic key 7 is authenticated (step S410), and when it is determined that the electronic key 7 has been authenticated, the door 2 is locked (step S411). On the other hand, when it is determined that the external force detection sensor 32 has not detected the application of the external force, or it is determined that the electronic key 7 has not been authenticated, the control operation is returned to the step S400 without locking the door 2.

After the door 2 is locked, it is determined whether or not a predetermined time has passed from the time when the door 2 was locked (step S412). In other words, a timer is started at the time when the door 2 is locked, and it is determined whether or not the time counted by the timer has reached a predetermined period of time. When it is determined that the predetermined time of period has not passed, at least the entry detection sensor 31 is deactivated (step S413). By deactivating the entry detection sensor 31, it is possible to prevent the door 2 from being unlocked unnecessarily when the user performs the pull operation to confirm that the door 2 is locked. The entry detection sensor 31 is deactivated until it is determined that a predetermined period of time has passed from the time when the door 2 was locked, and when it is determined that the predetermined period of time has passed, the control operation of the circuit portion 4 is terminated.

In the vehicle door control device 1 as described above, the circuit portion 4 releases the latch of the door 2 when the external force detection sensor 32 detects the application of the external force and when the entry detection sensor 31 detects the entry of the object, so that the risk of unintended latch release can be reduced. Further, the circuit portion 4 unlocks the door 2 when the entry detection sensor 31 detects the entry of the object while the door 2 is locked, so that user's convenience can be improved.

Further, the circuit portion 4 locks the door 2 when the entry detection sensor 31 does not detect the entry of the object and the external force detection sensor 32 detects the application of the external force while the door 2 is unlocked, so that the user's convenience can be improved.

Moreover, when the external force detection sensor 32 is the inductive sensor, the degree of freedom in design can be increased. That is, the sensor such as a piezoelectric element that detects the flexure of the sensor itself bends the sensor itself, resulting in dedicated design of the handle member 30. On the other hand, since the inductive sensor detects a change in a distance between a detecting portion and a portion to be detected, it is sufficient to incorporate the detecting portion (coil, etc.) and the portion to be detected (metal plate, etc.) into the existing handle member 30, so that higher degree of design freedom can be achieved.

Further, since the vehicle door handle device 3 according to the present embodiment is provided with the entry detection sensor 31 and the external force detection sensor 32, these sensors 31, 32 can be used to achieve the latch release control of the door 2 as described above, and the risk of unintended latch release can be reduced. The entry detection sensor 31 alone can detect the operation of holding the handle member 30, but it cannot detect the operation of pulling the door. That is, even if the entry detection sensor 31 is used alone, it is difficult to distinguish between the case where the hand is inserted only for unlocking and the case where the hand is inserted for opening the door. Similarly, although the external force detection sensor 32 alone can detect that any operation is applied to the handle member 30, it cannot determine whether the operation is an operation of pulling or pushing the handle member 30. That is, even if the external force detection sensor 32 is used alone, it is difficult to determine whether any operation has bee applied to the handle member 30 for locking, or a person has simply touched the handle member 30 while leaning against the vehicle body. As in the vehicle door handle device 3 according to the present embodiment, the use of the two sensors: the entry detection sensor 31 and the external force detection sensor 32 can clearly detect that the user pulls the handle member 30 to open the door, so that the risk of unintended latch release can be reduced.

The invention claimed is:

1. A vehicle door control device for controlling opening and closing of a door of a vehicle, wherein the vehicle door control device comprises:

a handle member attached to the door;

an entry detection sensor for detecting entry of an object into a space between the door and the handle member;

an external force detection sensor for detecting application of an external force to the handle member, the entry detection sensor and the external force detection sensor disposed together with the external force detection sensor closer to an outer surface of the handle and the entry detection sensor closer an inner surface of the handle; and a circuit portion connected to the entry detection sensor and the external force detection sensor, the circuit portion signals a drive assembly to release a latch of the door when the door is unlocked, and the external force detection sensor detects the application of the external force and the entry detection sensor detects the entry of the object, wherein the circuit portion unlocks the door when the entry detection sensor detects the entry of the object while the door is locked.

2. The vehicle door control device according to claim 1, wherein the external force detection sensor is an inductive sensor.

3. The vehicle door control device according to claim 1, wherein the entry detection sensor is an electrostatic capacitive proximity sensor.

4. A vehicle door control device for controlling opening and closing of a door of a vehicle, wherein the vehicle door control device comprises:

a handle member attached to the door;

an entry detection sensor for detecting entry of an object into a space between the door and the handle member:

an external force detection sensor for detecting application of an external force to the handle member, the entry detection sensor and the external force detection sensor disposed together with the external force detection sensor closer to an outer surface of the handle and the entry detection sensor closer an inner surface of the handle; and a circuit portion connected to the entry detection sensor and the external force detection sensor, the circuit portion signals a drive assembly to release a latch of the door when the door is unlocked, and the external force detection sensor detects the application of the external force and the entry detection sensor detects the entry of the object, wherein the circuit portion locks the door when the entry detection sensor does not detect the entry of the object and the external force detection sensor detects the application of the external force while the door is unlocked.

5. The vehicle door control device according to claim 4, wherein the external force detection sensor is an inductive sensor.

6. The vehicle door control device according to claim 4, wherein the entry detection sensor is an electrostatic capacitive proximity sensor.

7. A vehicle door control device for controlling opening and closing of a door of a vehicle, wherein the vehicle door control device comprises:

a handle member attached to the door;

an electronic key;

an entry detection sensor for detecting entry of an object into a space between the door and the handle member;

an external force detection sensor for detecting application of an external force to the handle member; and a circuit portion connected to the entry detection sensor and the external force detection sensor, the circuit portion being configured to perform a first control operation wherein authentication of the electronic key occurs before the entry detection sensor can detect the entry of the object or a second control operation wherein authentication of the electronic key occurs after the entry detection sensor detects the entry of the object, in either the first or the second control operation, the door is unlocked by authentication of the electronic key and the entry detection sensor detecting the entry of the object, and after the door is unlocked, the circuit portion being configured to signal a drive assembly to release a latch of the door when the door is unlocked, and the external force detection sensor detects the application of the external force and the entry detection sensor detects the entry of the object.

8. The vehicle door control device according to claim 7, wherein the circuit portion locks the door when the entry detection sensor does not detect the entry of the object and the external force detection sensor detects the application of the external force while the door is unlocked.

9. The vehicle door control device according to claim 7, wherein the external force detection sensor is an inductive sensor.

10. The vehicle door control device according to claim 7, wherein the entry detection sensor is an electrostatic capacitive proximity sensor.

11. The vehicle door control device according to claim 7, wherein, in the first control operation, the entry detection sensor and the external force detection sensor are not activated until authentication of the electronic key, after which the circuit portion activates the entry detection sensor and the external force detection sensor.

12. The vehicle door control device according to claim 11, wherein, in the second control operation, the entry detection sensor is activated before authentication of the electronic key.

* * * * *